United States Patent [19]

Shimokoriyama et al.

[11] Patent Number: 5,010,391
[45] Date of Patent: Apr. 23, 1991

[54] DIGITAL VIDEO SIGNAL PROCESSING DEVICE

[75] Inventors: Makoto Shimokoriyama, Kanagawa; Toshihiro Yagisawa, Tokyo, both of Japan

[73] Assignee: Canon Kabushiki Kaisha, Tokyo, Japan

[21] Appl. No.: 261,915

[22] Filed: Oct. 24, 1988

[30] Foreign Application Priority Data

Oct. 27, 1987 [JP] Japan .................. 62-272281
Oct. 27, 1987 [JP] Japan .................. 62-272284

[51] Int. Cl.$^5$ .......................................... H04N 11/10
[52] U.S. Cl. .................................. 358/14; 358/13
[58] Field of Search ................................ 358/13, 14

[56] References Cited

U.S. PATENT DOCUMENTS 4,531,151 7/1985 Hentschke ..................... 358/13
4,700,345 10/1987 Morcom et al. ................ 358/36
4,745,459 5/1988 Ninomiya et al. ............... 358/12

FOREIGN PATENT DOCUMENTS

158785 8/1985 Japan ............................... 358/12

Primary Examiner—John W. Shepperd
Attorney, Agent, or Firm—Robin, Blecker, Daley & Driscoll

[57] ABSTRACT

In a digital video signal processing device, a digital filter two-dimensionally limits the bandwidth of a digital video signal which is obtained by time-base multiplexing a digital luminance signal with a digital chrominance signal for each horizontal scanning line, and the signal which has been band-limited by the digital filter is offset-subsampled.

5 Claims, 8 Drawing Sheets

DIGITAL VIDEO SIGNAL PROCESSING DEVICE

BACKGROUND OF THE INVENTION

1. Field of the Invention

The present invention relates to a digital video signal processing device, and, more particularly, to a digital video signal processing device which employs a digital filter.

2. Description of the Related Art

In general, a video signal contains a large amount of information per unit time. The amount of information in a video signal per unit time increases greatly when the video signal is digitized. For example, when a NTSC television signal is converted to an 8-bit digital signal at a sampling frequency of 4 fsc (fsc: a color subcarrier frequency), a resultant digital signal has an amount of information which corresponds to a transmission bit rate of about 120 Mbps. Further, when three R, G, and B signals of the above-described NTSC television signal are respectively converted to 8-bit digital signals at a sampling frequency of 3 fsc, resulting digital signals exhibit a transmission bit rate of about 260 Mbps.

In recent years, research has been conducted on high-definition television signals obtained using a number of horizontal scanning lines per field which is about twice that for conventional television signals. A digital high-definition television signal has a large amount of information per unit time, and the transmission bit rate thereof is extremely high. For example, when R, G and B video signals of a high-definition television signal are respectively converted to 8-bit digital signals at a sampling frequency of 64 MHz, the bit rate for resultant signals is 1.5 Gbps.

In order to improve the transmission efficiency, so-called time compressed integration (TCI) has been practiced recently in which a chrominance signal is time-base compressed relative to a luminance signal, the resultant chrominance signal being time-division multiplexed with the luminance signal. Even when a high-definition television signal on which time compressed integration has been performed is converted to an 8-bit digital signal with a sampling frequency of 64 MHz, a resultant digital signal is transmitted at a bit rate as high as about 510 Mbps.

Thus, a digital video signal has a high bit rate, and transmission of such a digital signal through a telecommunication system therefore requires a telecommunication line of large capacity, thus making the capacity of telecommunication lines inadequate and/or increasing transmission costs. Further, recording of such a digital signal having a high bit rate on a recording medium such as a magnetic recording medium creates certain problems since recording heads are incapable of coping with such a signal or recording times are shortened.

Accordingly, various bandwidth compression techniques have been proposed for the purpose of reducing the amount of information contained in a digital signal. One of them is the so-called offset subsampling technique. In this offset subsampling technique, the components of an image in diagonal directions which are not important from the visual point of view are removed by a spatial filter, and high-frequency components are provided in this cleared frequency region so as to lower the sampling frequency. Such an offset subsampling falls into two categories: one is a line offset subsampling (LOSS) in which sampled positions shift in adjacent scanning lines in one field, and the other is a field offset subsampling (FOSS) in which sampled positions shift in adjacent scanning lines of adjacent fields. In both cases, two-dimensional band limitation has to be conducted using the above-described spatial filter which acts as a prefilter before offset sampling is performed. Further, when the digital signal on which offset subsampling has been performed is decoded, spatial interpolation has to be conducted using a spatial filter which acts as a postfilter.

In the case of subsampling a color video signal, subsampling is performed on each of the component signals, e.g., a luminance signal and two types of color-difference signals, which means that spatial filters serving as a prefilter and postfilter is required for each signal.

These spatial filters generally include a plurality of series-connected one horizontal scanning period (H) delay lines, and a plurality of multipliers for multiplying respective coefficients, and are relatively large in size. Conventional offset subsampling which is one form of bandwidth compression technique requires provision of a plurality of number of spatial filters, and this increases the overall size of a device and production costs.

Figure 1:
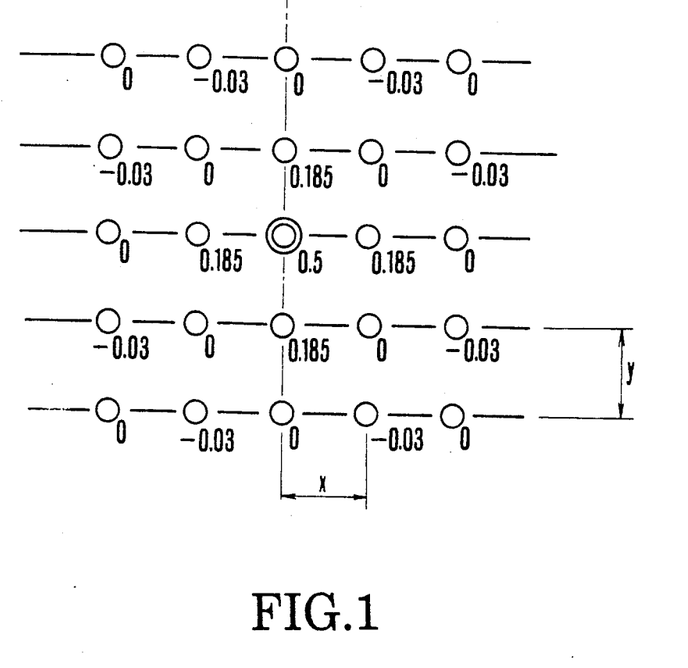
FIG. 1 illustrates an example of multiplication by coefficients which is conducted by a digital spatial filter.

If a spatial filter is of the type which has 25 taps for multiplying 25 picture elements including a center picture element by coefficients, as shown in FIG. 1, the number of coefficient multipliers, multipliers, adders and digital delay lines in a signal processing circuit must be made to correspond to the number of taps. Each of the coefficient multipliers may be a RAM or ROM table. As a result, if offset subsampling is performed on a magnetic recording/reproducing machine such as a VTR, a spatial filter having a large configuration must be respectively provided for recording and reproduction, increasing the overall size of a filter circuit. Similarly, in the case of a transmitter/receiver for telecommunication lines, a spatial filter is required for both of the transmitting and receiving sides, thereby increasing the overall size of a circuit. In FIG. 1, reference symbols x and y denote gaps between the picture elements in the horizontal and vertical directions, respectively.

SUMMARY OF THE INVENTION

An object of the present invention is to provide a digital video signal processing device which is designed to obviate the above-described problems of a conventional device.

Another object of the present invention is to provide a digital video signal processing device which enables the number of digital filters to be reduced as much as possible so as to provide a circuit that is small in size.

Still another object of the present invention is to provide a digital video signal processing device that can be employed to perform offset subsampling.

To achieve the above-described objects, the present invention provides, in one of its aspects, a digital video signal processing device which comprises time-base multiplexing means for providing a time-base multiplexed signal by time-base multiplexing a digital luminance signal with a digital chrominance signal for each horizontal scanning line, a digital filter for band limiting the time-base multiplexed signal in a two-dimensional frequency region, and sampling means for offset sampling the time-base multiplexed signal output from the digital filter.

The present invention provides, in another of its aspects, a digital video signal processing device which comprises signal processing means including subsampling means for subsampling a digital video signal, a digital filter for limiting the bandwidth of a digital video signal, inputting means for inputting a digital video signal; and switch-over means for switching over the operation of the device between a first state in which a digital video signal input from the inputting means is input to the digital filter and the digital video signal output from the digital filter is supplied to the signal processing means and a second state in which the digital video signal which has been subsampled is supplied to the digital filter.

Other objects and features of the prevent invention will become apparent from the following detailed description of the preferred embodiments thereof, taken in conjunction with the accompanying drawings.

DETAILED DESCRIPTION OF THE PREFERRED EMBODIMENTS

Figure 2:
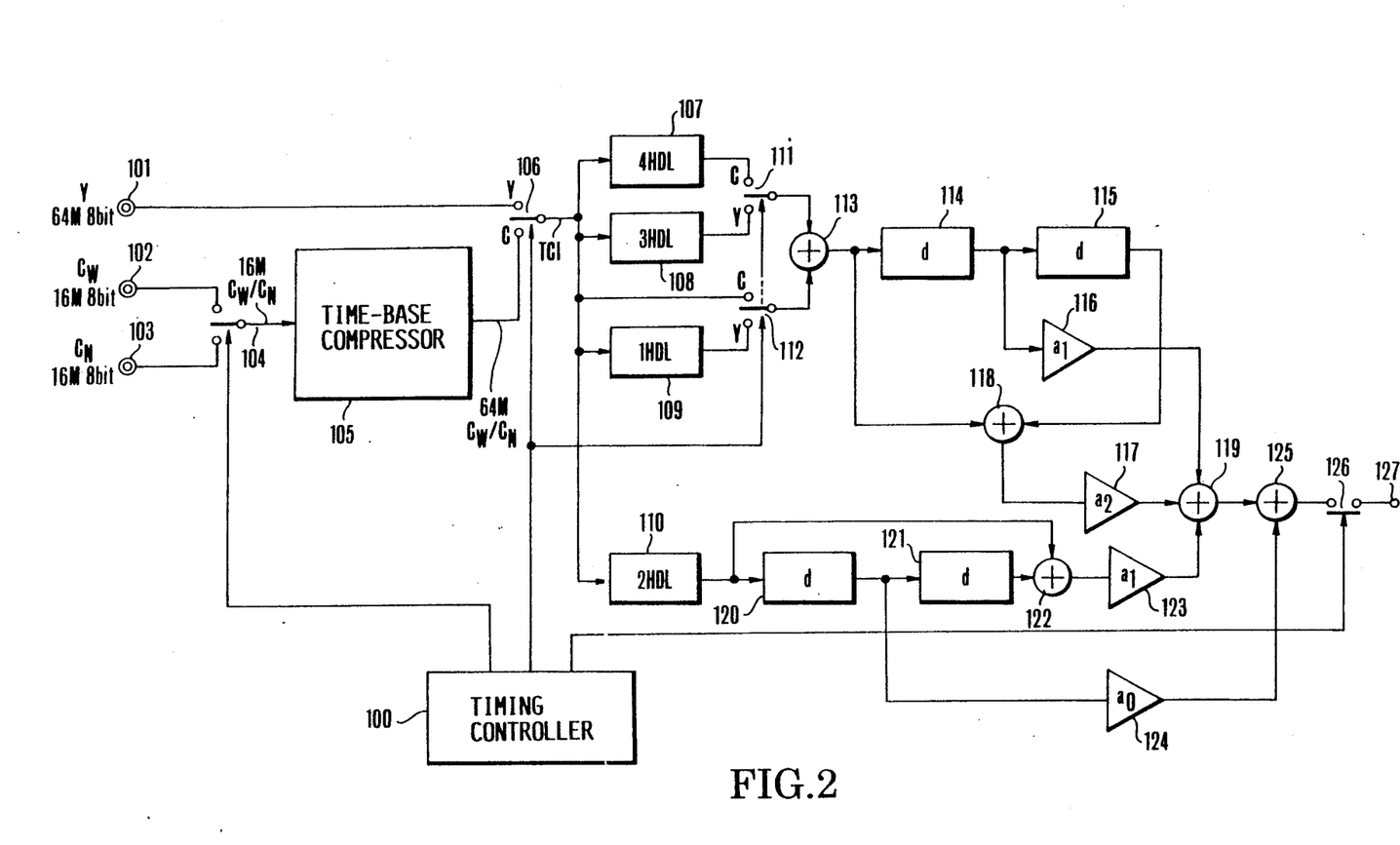
FIG. 2 is a diagram of a signal processing device, showing a first embodiment of the present invention.

A first embodiment of the present invention will be described in detail below. Referring first to FIG. 2 which shows a device for processing a high-definition television signal, a luminance signal (Y) of the high-definition television signal is input to an input terminal 101, and two color-difference signals ($C_N$, $C_W$) of the high-definition television signal are input to input terminals 102 and 103, respectively. The luminance signal (Y) which is input is represented by an 8-bit digital signal of 64 MHz, and the color-difference signals ($C_N$, $C_W$) which are input are each represented by an 8-bit digital signal of 16 MHz. A switch 104 is controlled by a timing controller 100 such that the connection thereof is switched over for each horizontal scanning period. Therefore, the switch 104 outputs a color-difference line-sequential signal $C_W/C_N$ in which the color-difference signals $C_N$ and $C_W$ exit alternately for every other horizontal scanning line. The signal output from the switch 104 is supplied to a time-base compressor 105 where its time-base is compressed to one fourth. The time-base compressor 105 may comprise a line memory. The writing clock thereof has a frequency of 16 MHz, and the read out clock has a frequency of 64 MHz. The read out timing of the time-base compressor 105 is set to a time interval equivalent to one fourth of one horizontal scanning period which corresponds to the blanking period for the luminance signal (Y).

A switch 106 is controlled such that it selectively outputs a color-difference line-sequential signal which has been time-base compressed to one fourth and a luminance signal (Y), that is, such that it outputs a luminance signal (Y) during a time period equivalent to four fifths of one horizontal scanning period and a time-base compressed color-difference line-sequential signal during the remaining time period, i.e., one fifth of one horizontal scanning period. Thus, the switch 106 outputs an 8-bit- digital TCI signal of 64 MHz.

A spatial filter includes a 4 horizontal scanning period (4H) delay line (DL) 107, a horizontal scanning period (3H) delay line 108, a 1 horizontal scanning period (1H) delay line 109, a 2 horizontal scanning period (2H) delay line 110, and switches 111 and 112 which are connected to a Y side while the switch 106 is being connected to the Y side and to a C side while the switch 106 is being connected to the C side. Switch-over of the switches 106, 111, and 112 is controlled by the timing controller 100 such that they are connected to the Y and C sides at a ratio of 4:1 in one horizontal scanning period.

An adder 113 adds the output of the 1H delay line 109 and that of the 3H delay line 108 when a luminance signal (Y) is output from the switch 106. It adds the output of the 4H delay line 107 and that of the switch 106 for a color-difference line-sequential signal ($C_N/C_W$).

The spatial filter also includes a 1 data period delay line 114 for delaying the output of the adder 113 by a time period equivalent to that of one data, a 1 data period delay line 115 for further delaying the output of the delay line 114 by a time period equivalent to that of one data, coefficient multipliers 116 and 117 for respectively multiplying the input data by coefficients $a_1$ and $a_2$, an adder 118 for adding the output of the adder 113 and that of the delay line 115, an adder 119 for adding the outputs of the adders 116 and 117 and the output of a coefficient multiplier 123 which is to be described later, 1 data period delay lines 120 and 121, an adder 122, the coefficient multiplier 123 for multiplying the output of the adder 122 by a coefficient $a_1$, a coefficient multiplier 124 for multiplying the output of the delay line 120 by a coefficient $a_0$, and an adder 125 for adding the output of the adder 119 to that of the coefficient multiplier 124.

Figure 3A:
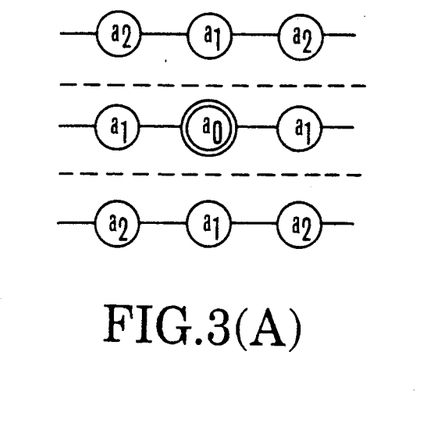
FIGS. 3(A) and 3(B) illustrate the operation of a digital spatial filter provided in the processing device of FIG. 2.
Figure 3B:
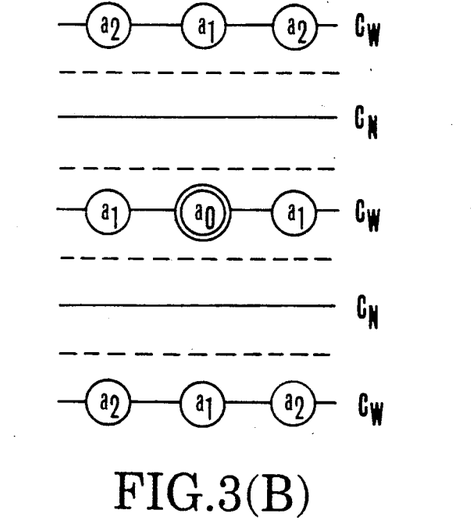

The operation of the spatial filter which includes the circuits 107 through 125 will be described below with reference to FIGS. 3(A) and 3(B). In this filter, the data of a center picture element is delayed by a time period equivalent to that indicated by (2H+d) by the 2H delay line 110 and the delay line 120. The 9 picture elements in a luminance signal (Y) including a center picture element located at the center are multiplied by coefficients shown in FIG. 3(A), and the 9 picture elements in a color-difference signal ($C_W$ or $C_N$) are multiplied by coefficients shown in FIG. 3(B). The picture elements which are double-circled in FIGS. 3(A) and 3(B) are center picture elements.

When the switch 106 outputs a luminance signal Y, the adder 113 adds the outputs of the 3H delay line 108 and 1H delay line 109. The output of the adder 113 is the sum of the signals which are respectively delayed by ±1 horizontal scanning period relative to the output of the 2H delay line 110. Accordingly, the output of the delay line 114 is also delayed by ±1H horizontal scanning period relative to the output of the delay line 120.

Therefore, the picture elements located immediately above and below the center picture element in the upper and lower horizontal lines are multiplied by the coefficient multiplier 116 using a coefficient $a_1$, and the picture elements located adjacent to those picture elements, i.e., the output of the adder 118, are multiplied by the coefficient multiplier 117 using a coefficient of $a_2$. The picture elements located adjacent to the center picture element on the same horizontal scanning line, i.e., the output of the adder 122, are multiplied by the coefficient multiplier 123 using a coefficient $a_1$, and the center picture element is multiplied by the coefficient multiplier 124 using a coefficient $a_0$. Thus, the 9 picture elements of a luminance signal (Y) are multiplied by the coefficients shown in FIG. 3(A), and a desired filtering can be performed by suitably determining the coefficients $a_0$, $a_1$, and $a_2$.

In the case of a color-difference signal $C_W$, the spatial filter is operated in the same manner as that in which it is operated in the case of the luminance signal Y with the exception that the adder 113 adds the output of the 4H delay line 107 and the output of the switch 106, and that the output of the adder 113 is delayed by ±2 horizontal scanning periods relative to the output of the 2H delay line 110. As a result, the 9 picture elements in the color-difference signal $C_W$ are multiplied by the coefficients shown in FIG. 3(B). In other words, the bandwidth of the color-difference signal $C_W$ which is limited in the vertical direction of the picture elements is one half that of the luminance signal Y. This is because the color-difference signal $C_W$ or $C_N$ exists for every other horizontal scanning line.

Figure 4A:
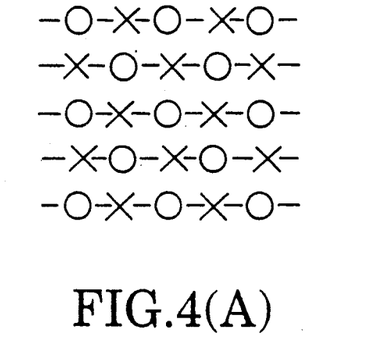
FIGS. 4(A) and 4(B) illustrate subsampling performed by the processing device of FIG. 2.
Figure 4B:
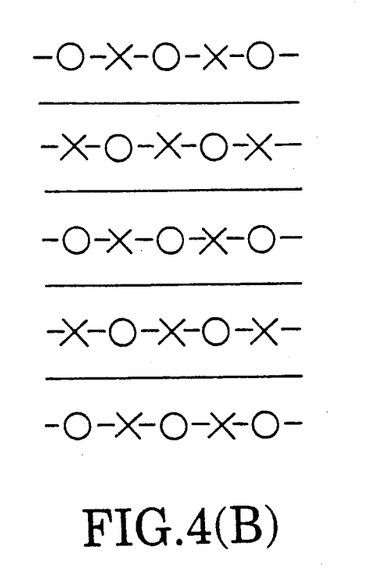

The digital signal which is output from the above-described spatial filter is subsampled by a switch 126 so as to reduce the amount of information, and a resultant signal is output from a terminal 127. The subsampling which is performed on the luminance signal Y is 1 line offset subsampling, and that conducted to the color-difference signal $C_N$ or $C_W$ is 2 line offset subsampling. FIG. 4(A) schematically illustrates the picture elements in a luminance signal Y to be subsampled, and FIG. 4(B) schematically illustrates the picture elements in a color-difference signal $C_N$ or $C_W$ to be subsampled. In FIGS. 4(A) and 4(B), a reference symbol o denotes a picture element transmitted, and x denotes a picture element which is not transmitted. As is apparent from the figures, the sampling frequency in the vertical direction for the color-difference signal $C_N$ or $C_W$ is one half that of the luminance signal Y, and the bandwidth in the vertical direction which is limited by the spatial filter for the color-difference signal $C_N$ or $C_W$ is therefore one half that of the luminance signal Y.

With the above-described circuit arrangement of the spatial filter, two-dimensional band limitation for the luminance signal and chrominance signal is possible by supplying a TCI digital signal to this spatial filter, reducing the overall size of a hardware. Further, 2 line offset subsampling is performed on the color-difference line-sequential signal. In order to achieve this, the vertically limited bandwidth of the spatial filter is varied, thereby preventing an increase in the overall size of the hardware.

The above-described embodiment uses a TCI signal which is obtained by time-division multiplexing a luminance signal Y with a color difference line-sequential signal $C_W/C_N$ at a ratio of 4:1. However, other forms of signal may also be employed. For example, a signal obtained by time-division multiplexing a luminance signal Y with color-difference signals $C_W$ and $C_N$ at a 4:1:1 ratio may be input to one spatial filter.

Figure 5:
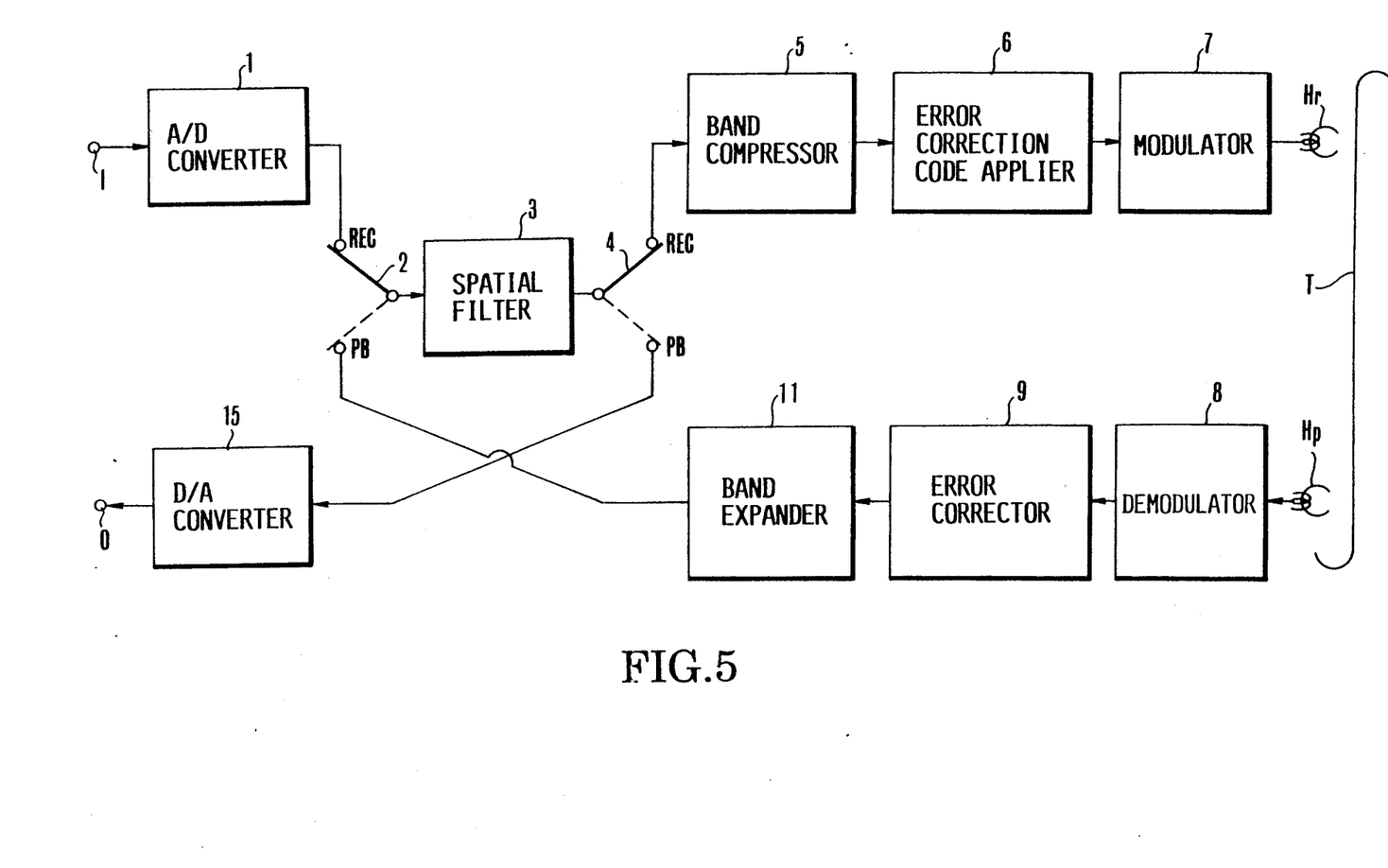
FIG. 5 is a diagram of a VTR, showing another embodiment of the present invention.

FIG. 5 is a block diagram of a video tape recorder (VTR) to which the digital signal processing device according to the present invention is applied, showing another embodiment of the present invention. The video tape recorder includes an analog-digital (A/D) converter 1, switches 2 and 4 for switching over the mode operation between a recording mode and a reproduction mode, a spatial filter 3, a band compressor 5, an error correction code applier 6, a digital modulator 7, a demodulator 8, an error corrector 9, a band expander 11, and a digital-analog (D/A) converter 15.

A picture signal which is input in a recording mode is converted to a digital signal by the A/D converter 1, and a resultant digital signal is supplied to the spatial filter 3 where the frequency bandwidth of the signal which generates aliasing noise is two-dimensionally cut. Thereafter, compression, such as non-transmission of picture elements which are selected by the offset subsampling or differential pulse code modulation (DPCM), is performed on the output of the spatial filter by the band compressor 5. After an error correction code has been appended to the output of the band compressor 5 by the error correction code applier 6, the signal passes through the digital modulator 7, and is recorded on a recording medium T by a head Hr.

A signal which is read out from the recording medium T by a head Hp in a reproducing mode is demodulated by the demodulator 8, and is then error corrected by the error corrector 9. Thereafter, band expansion, such as insertion of 0 data in the picture elements not transmitted or DPCM decoding, is performed on the output of the error corrector 9. The output of the expander 11 is passed through the spatial filter 3 by the connection of the switch 2 to the PB side where the picture elements of the signal which have not been transmitted as the result of subsampling when they were recorded are interpolated. The output of the spatial filter 3 is passed through the D/A converter 15, and is thereby output as a picture signal which is reproduced.

The thus-arranged video tape recorder includes one spatial filter 3 which acts as a prefilter for a recording system and a postfilter for a reproduction system. In consequence, the circuit configuration is made simple.

Figure 6:
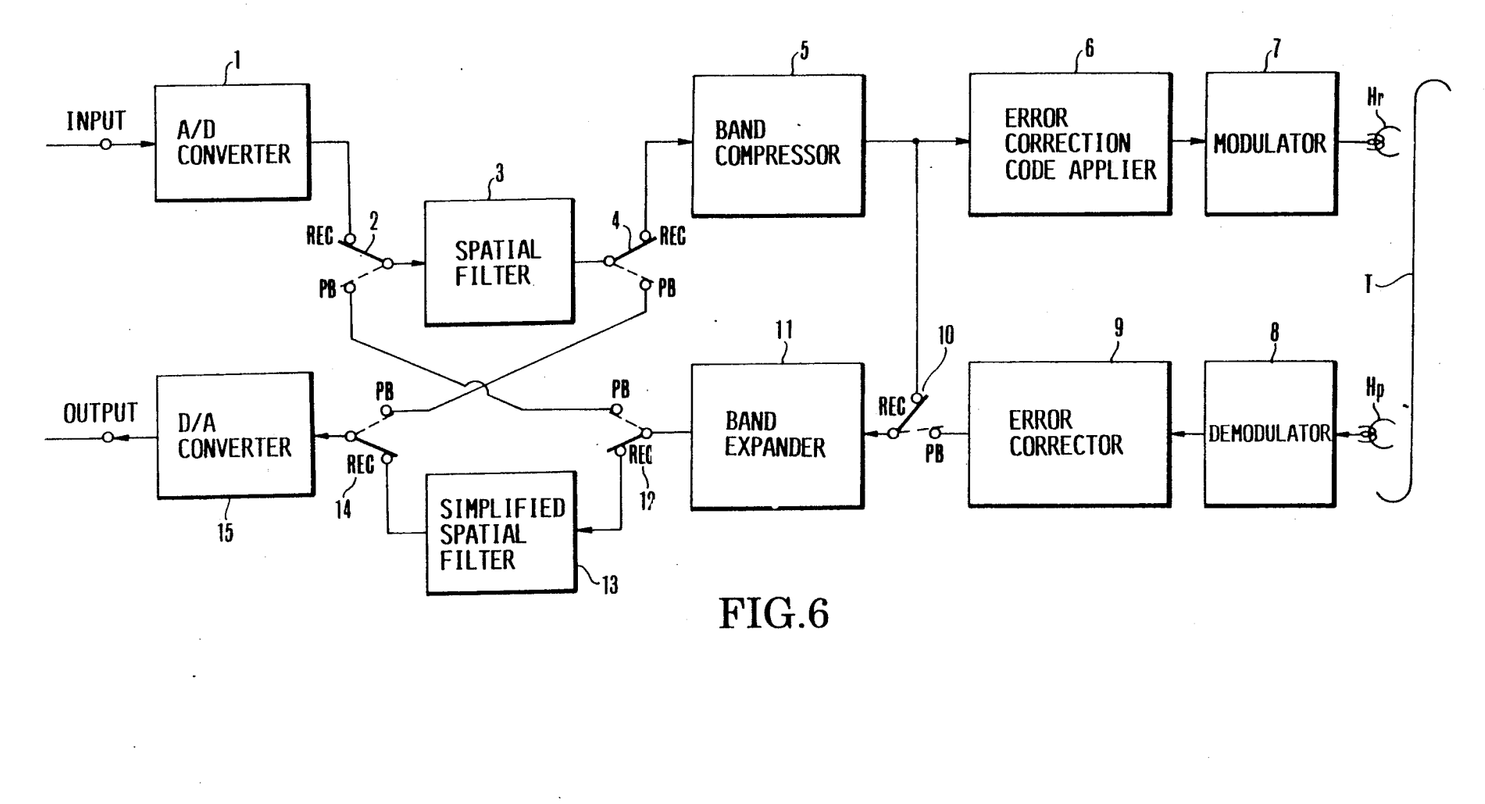
FIG. 6 is a diagram of a VTR, showing still another embodiment of the present invention.

FIG. 6 is a block diagram of another example of a video tape recorder, showing still another embodiment of the present invention. The same reference numerals are used to denote the parts identical to those in the VTR shown in FIG. 5, description thereof being omitted.

This embodiment differs from the previous embodiment in that the former further includes a simplified spatial filter 13 for performing an interpolation in a simplified form so as to enable a monitor to be provided with an EE system.

In this embodiment, a video signal which is input in a recording mode passes through the A/D converter 1, the spatial filter 3, the band compressor 5, the error correction code applier 6, the digital modulator 7, and is recorded on a medium T through the head Hr, as in the case of the embodiment shown in FIG. 5. However, the signal which has passed through the band compressor 5 is branched, and is supplied to the band expander 11 by the connection of a switch 10 to the REC side.

The video signal is then supplied from the band expander 11 to the simplified spatial filter 13 by the connection of a switch 12 to the REC side where an interpolation is performed thereon in a simplified form. The output of the spatial filter 13 passes through a switch 14 which is connected to the REC side, then through the D/A converter 15, and is output as an analog picture signal for a monitor.

Figure 7:
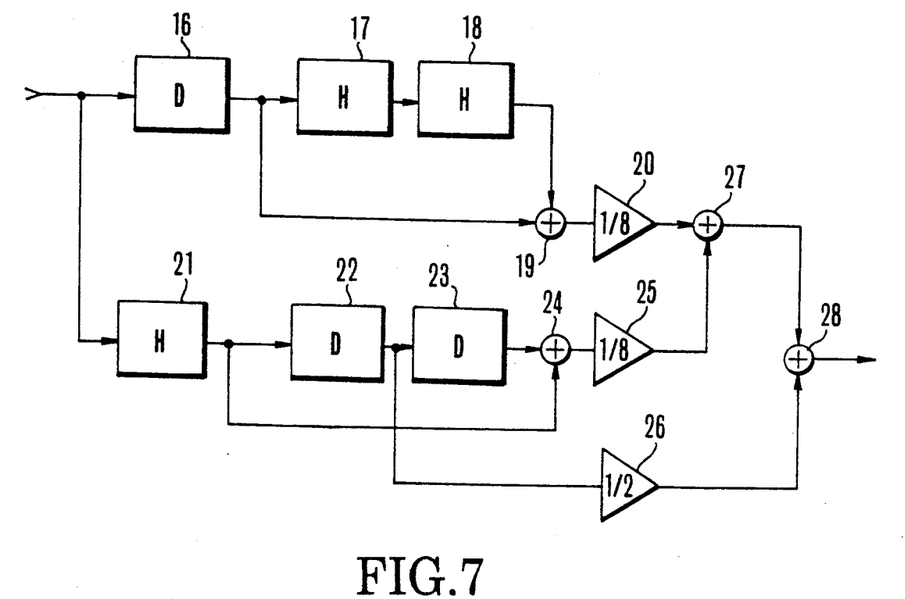
FIG. 7 shows a simplified digital filter employed in the VTR of FIG. 6.

FIG. 7 shows the structure of the simplified spatial filter 13 employed in the above-described embodiment. The spatial filter 13 includes 1 sampling period (D) delay lines 16, 22 and 23, 1 horizontal scanning period (H) delay lines 77, 18 and 21, adders 19, 24, 27 and 28, ⅛ coefficient multipliers 20 and 25, and a ¼ coefficient multiplier 26.

Figure 8:
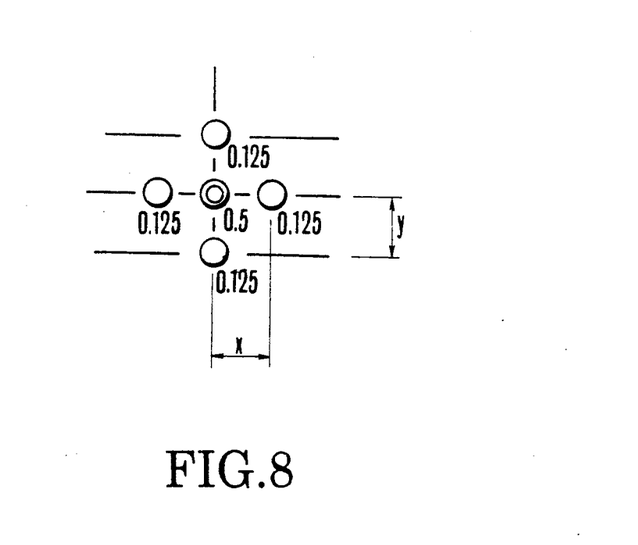
FIG. 8 illustrates the operation of the digital filter of FIG. 7.

FIG. 8 shows coefficients which are used by the spatial filter to multiply the 5 picture elements including a center picture element, assuming the output of the D delay line 22 is the data for the center picture element. A picture element which is double-circled in FIG. 8 is the center element.

The simplified spatial filter shown in FIG. 7 ensures a certain degree of band limitation, and is therefore sufficient for use in a recording or transmission monitor, since deterioration of an image quantity is allowed to some extent in such a monitor. Further, since the coefficient multipliers 20, 25 and 26 in the spatial filter shown in FIG. 7 are far smaller, when compared with that including the spatial filter shown in FIG. 1 which employs coefficients for 25 picture elements.

Figure 9:
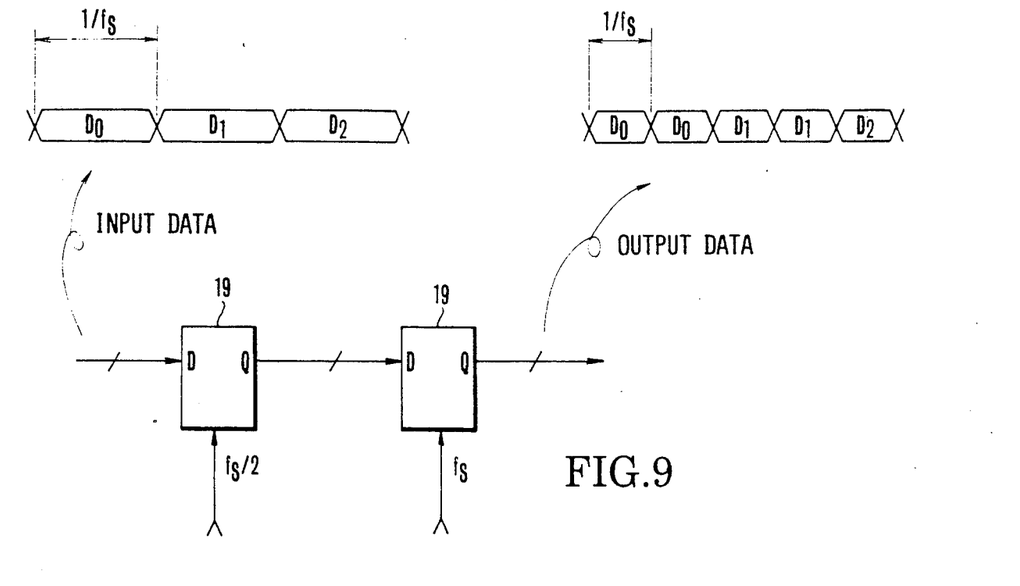
FIG. 9 shows another example of the simplified digital filter of FIG. 6.
Figure 10:
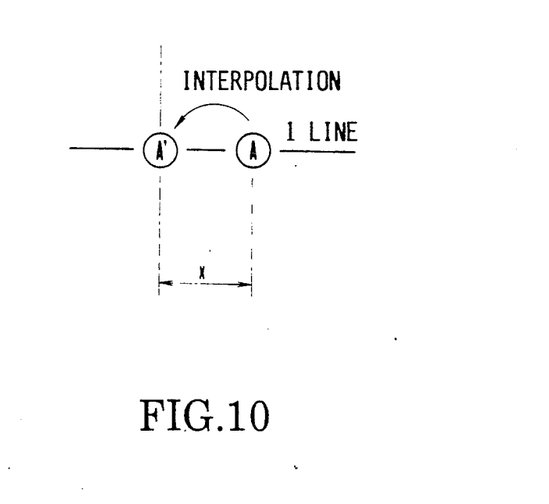
FIG. 10 illustrates the operation of the digital filter of FIG. 9.

The simplified filter 13 included in the VTR shown in FIG. 6 is used for a monitor, and may therefore by replaced with a simpler filter. For example, a pre-interpolation filter having series-connected D flip-flops 19 and 19' which is shown in FIG. 9 may be employed to perform interpolation in a simple form only on the picture element located immediately before that picture element in the same horizontal scanning line. This further reduces the size of the circuit and production costs. The data handled by the interpolation filter shown in FIG. 9 is used to interpolate the data of the picture element which is located immediately before that picture element, as shown in FIG. 10.

Generally, a circuit monitor employed for recording is used to determine whether or not the circuit is operating or whether or not a picture signal is being input. Therefore, the simplified filters shown in FIGS. 7 and 9 are good enough.

In the above-described embodiments, the digital video signal processing device according to the present invention is applied to a VTR. However, it can be also applied to a transmitter/receiver for communication channel.

As will be understood from the foregoing description, in the present invention, the circuit configuration of a video signal processing device for performing offset subsampling is simplified, reducing production costs and the overall size of the device.

What is claimed is:

1. A digital video signal processing device, comprising:
   (a) time-division multiplexing means for providing a time-division multiplexed signal by time-division multiplexing a digital luminance signal with a line-sequential digital color difference signal for each horizontal scanning line;
   (b) a digital filter for limiting a bandwidth of said time-division multiplexed signal in a two-dimensional frequency region, said digital filter including a delay circuit for delaying said time-division multiplexed signal;
   (c) sampling means for subsampling said time-base multiplexed signal output from said digital filter; and
   (d) control means for controlling a bandwidth to be limited by said digital filter, said control means including a switching circuit for switching a delay time of said delay circuit so that said digital luminance signal is delayed for a first delay time and said line-sequential digital color differential signal is delayed for a second delay time which is different from the first delay time where said bandwidth is determined corresponding to a two-dimensional frequency by said sampling means for said digital luminance signal and said line-sequential digital color difference signal.

2. A device according to claim 1, wherein said control means is arranged to switch over the bandwidth to be limited between a first bandwidth for said digital luminance signal and a second bandwidth for said line-sequential digital color differential signal; said second bandwidth to be limited is narrower in the vertical direction of an image as compared with said first bandwidth to be limited; and said first and second bandwidths to be limited are substantially equal to each other in the horizontal direction of the image.

3. A digital video signal processing device, comprising:
   (a) time-division multiplexing means for providing a time-division multiplexed signal by time-division multiplexing a digital luminance signal with a line-sequential digital color differential signal for each horizontal scanning line;
   (b) a digital filter for limiting a bandwidth of said time-division multiplexed signal in a two-dimensional frequency region, said digital filter comprising a delay circuit for producing n signals, n being integer more than 2, by delaying said time-division multiplexed signal for n predetermined delay times which are different from each other, a selection circuit which selectively outputs m of said n signals, m being integer less than n, and computing means for computing said m signals outputted by said selection circuit; and
   (c) switching means for switching over a bandwidth to be limited by said digital filter in a vertical direction by controlling said selection circuit so that at least one of output signals of said selection circuit includes said digital luminance signal delayed for a first delay time and said line-sequential digital color differential signal delayed for a second delay time which is different from the first delay time.

4. A device according to claim 3, further comprising sampling means for offset sub-sampling said time-base multiplexed signal output from said digital filter.

5. A device according to claim 4, wherein said switching means is arranged to switch over a bandwidth to be limited by said digital filter between a first bandwidth and a second bandwidth, where said first and second bandwidths are determined corresponding to a two-dimension frequency by said sampling means for said digital luminance signal and said line-sequential digital color difference signal.

* * * * *